United States Patent [19]

Harmer

[11] 4,437,547
[45] Mar. 20, 1984

[54] FRICTION LINING WEAR INDICATORS FOR SHOE-DRUM BRAKES

[75] Inventor: George A. Harmer, Solihull, England

[73] Assignee: Lucas Industries Limited, Birmingham, England

[21] Appl. No.: 373,276

[22] Filed: Apr. 29, 1982

Related U.S. Application Data

[62] Division of Ser. No. 116,668, Jan. 29, 1980, Pat. No. 4,344,509.

[30] Foreign Application Priority Data

Feb. 15, 1979 [GB] United Kingdom ............... 7905321

[51] Int. Cl.³ .................................................. F16D 66/02
[52] U.S. Cl. ................................. 188/1.11; 340/52 A
[58] Field of Search ............. 116/208; 200/61.4, 61.44; 188/1.11

[56] References Cited

U.S. PATENT DOCUMENTS 3,783,979  1/1974  Hess ................................. 188/1.11

FOREIGN PATENT DOCUMENTS 2260724  9/1975  France ................................. 188/1.11

Primary Examiner—Duane A. Reger
Attorney, Agent, or Firm—Scrivener, Clark, Scrivener and Johnson

[57] ABSTRACT

A friction lining wear indicator for shoe-drum brakes comprising a sensor mounted on a brake shoe, which actuates an indicator when the thickness of a friction lining carried by a platform of the shoe for engagement with a drum is less than a predetermined value. In order to locate the sensor at the most effective position without machining the lining or fastening the sensor permanently to the shoe, the sensor is located by a mounting device located in a depression in an edge of the platform, and co-operates with the shoe to retain the sensor adjacent the lining. The mounting device comprises a plastics plug, or a resilient clip, and the retaining device is releasable. The sensor comprises a wire loop or a pressed insulation-coated metal strip, and may be integral with the mounting device. The sensor and the drum are connected in a circuit with the indicator which is actuated when the sensor touches the drum.

12 Claims, 16 Drawing Figures

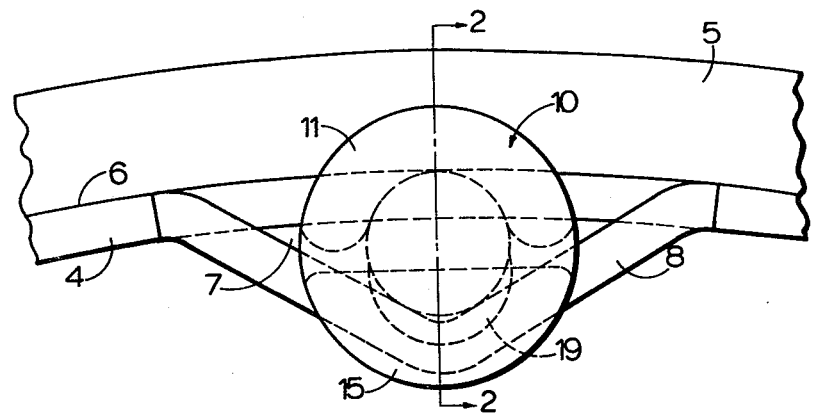
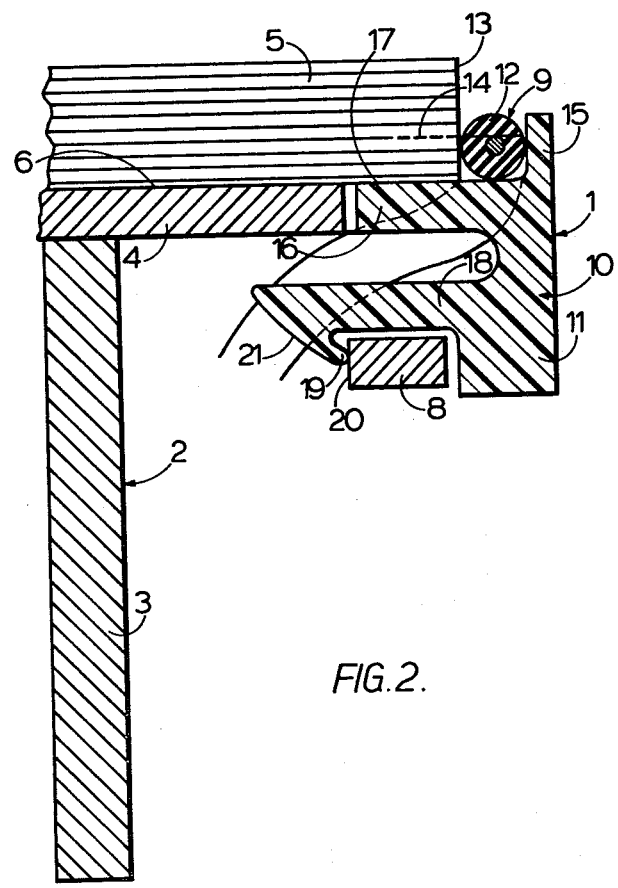

FRICTION LINING WEAR INDICATORS FOR SHOE-DRUM BRAKES

This application is a division of application Ser. No. 116,668, filed Jan. 29, 1980 now U.S. Pat. No. 4,344,509 issued 08/17/82.

This invention relates to friction lining wear indicators for shoes of shoe-drum brakes of the kind in which a sensor mounted on a brake shoe actuates an indicating means when the thickness of a friction lining, carried by a platform of the shoe for engagement with a rotatable drum, is less than a predetermined value, and in particular to means for mounting the sensor on the shoe.

Friction linings in shoe-drum brakes do not wear at a uniform rate as the pressure of the shoe on the drum is not uniform. The centre of maximum pressure tends to be at the circumferential centre of the shoe rather than at the ends, and so this is the most effective position for a lining wear indicator.

One known construction of lining wear indicator for a shoe-drum brake involves machining the lining material in order to insert the sensor in the lining adjacent the centre of maximum pressure. This has the disadvantage of being expensive, and may also be difficult to perform satisfactorily. In another construction the sensor is fastened permanently to the shoe or the lining. This may make it difficult to replace the sensor, or it may interfere with the replacement of worn friction linings.

In a further construction the sensor is rigidly secured in a dielectric block which is secured to a circumferential end of the shoe. This has the advantage of being simple to fit, but is not at the centre of maximum pressure.

According to our invention, in a lining wear indicator of the kind set forth the sensor is mounted on the shoe by mounting means located in a depression formed in one edge of the platform, and the mounting means is provided with retaining means adapted to cooperate with the shoe for retaining the sensor in a position of use adjacent the lining.

Thus the sensor can be located at or near the centre of maximum pressure by forming the depression at an appropriate place on the platform. Preferably the retaining means is releasable so that the sensor and the mounting means can easily be removed for replacement, or to facilitate re-lining of the shoe.

The sensor and the drum with which a lining is adapted to engage are preferably connected in series in a circuit containing the indicating means, such that when the sensor touches the drum the indicating means, which may be a warning light, is actuated. The circuit may be completed or broken to actuate the indicating means.

The mounting means preferably comprises a plug of plastics material, which may have one or more components. The retaining means may comprise at least one lip which engages with the shoe to retain the plug in the depression. In another construction the mounting means comprises a resilient clip, preferably metal, so shaped that it is retained in the depression by its resilience.

The sensor may be integral with the mounting means, or may be a separate loop of wire, or a pressed insulation-coated metal strip.

The depression is preferably formed by shearing a portion of the edge of the platform, but may be non-sheared. In either case the depression can be formed to accommodate a particular shape or type of mounting means and/or sensor. The depression may be similar to that commonly formed on the edges of drum brake shoes for the purpose of providing a location for the shoe on a stationary backplate of the brake.

Some embodiments of our invention are shown in the accompanying drawings in which:

FIG. 1 is an end view of an indicator located in a sheared depression in a brake shoe;

FIG. 2 is a section on the line 2—2 of FIG. 1;

Figure 3:
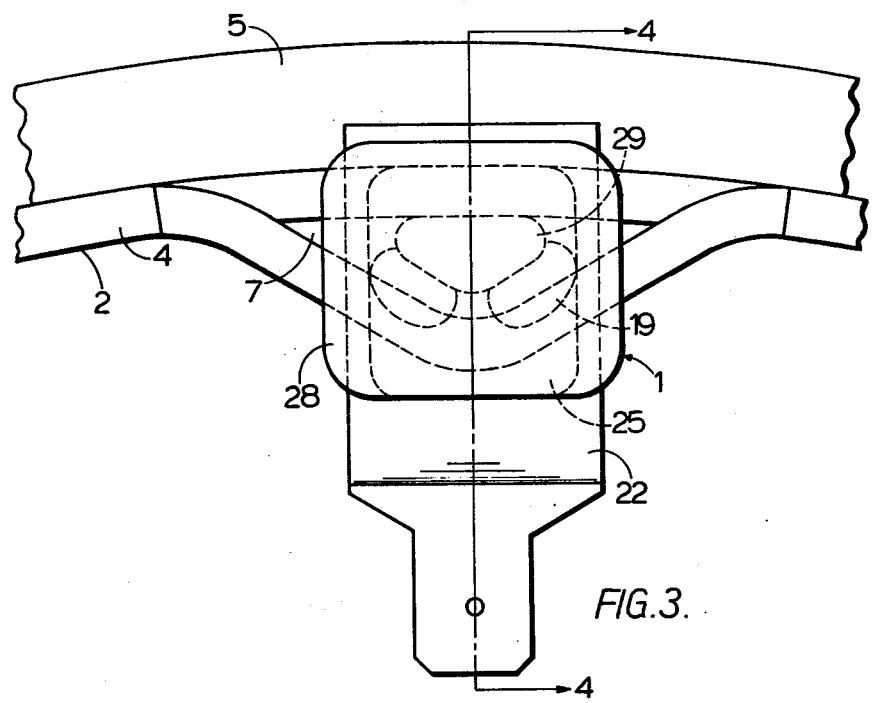
FIG. 3 is a view similar to FIG. 1 showing a modified indicator.

The lining wear indicator 1 shown in FIGS. 1 and 2 is mounted on a brake shoe 2. The brake shoe 2 comprises an arcuate web 3 which carries a platform 4, and a lining of friction material 5, for engagement with a rotatable drum (not shown), is mounted on the outer radial edge 6 of the platform 4. The lining 5 may be fixed on the platform by any conventional means. Thus the lining 5 may be pre-moulded, and fixed to the platform 4 by bonding, or by rivets. Alternatively, the lining 5 may be moulded integrally onto the platform 4. One axial edge of the platform 4 is provided with a depression 7 which is formed by shearing a local portion 8 of the platform 4 in a radial direction and is located at or near the centre of maximum pressure of the drum on the shoe 2 in use. If convenient, the depression 7 may be located at other positions on the shoe 2.

The lining wear indicator 1 is located in the depression 7 and comprises a sensor 9 which is held in position by mounting means 10 comprising a plug 11.

The sensor 9 comprises a loop of wire 12 contained in insulating material, which is held next to the axial edge 13 of the lining 5. When the lining is substantially unworn, as shown in the drawings, the rotatable drum will not come into contact with the wire 12. However, when the lining 5 is worn to the level indicated by 14 the drum will contact the wire 12 to actuate an indicating means (not shown). The wire 12 and the drum are connected to an electric circuit (not shown) which contains the indicating means, which is preferably a warning light. Contact of the drum and the sensor will complete or break the circuit to actuate the warning light.

The plug 11 is constructed of an insulating material, and is preferably of plastics material. The plug 11 has a cylindrical end portion 15 from which two axial projections extend perpendicularly. In the position shown in the drawings a first projection 16 is aligned with the non-sheared portion of the platform 4, and a part of the projection 16 remote from the end 15 is in contact at its outer surface 17 with the lining 5. The sensor 9 is adapted to be held against the edge 13 of the lining 5 by the end 15 and the outer surface 17 of the projection 16 which is not in contact with the lining 5.

A second projection 18 is longer than the first projection 16, and is provided with the retaining means. The second projection 18 extends through the gap between the platform 4 and the sheared portion 8, and the retaining means which comprises an integral lip 19 formed on the outer edge of the projection 18, engages with the edge 20 of the sheared portion 8 nearer the web 3. The plug 11 is thus held in position by the retaining lip 19. The outer edge 21 of the lip 19 is angled to facilitate insertion of the plug 11.

Assembly of the indicator 1 is effected by locating the sensor 9 and then inserting the plug 11 in the depression to hold it in place. The projection 18 deflects towards projection 16 as the angled edge meets the sheared portion 8, and springs back when the lip 19 reaches the edge 20 to retain the plug 11 in position.

The plug is removed by manual deflection of the projection 18 to disengage the retaining lip 10.

The indicator 1 actuates the indicating means when the rotatable drum contacts the sensor 9 (as described above) at the predetermined level of lining thickness.

The rest of the drawings show modifications of the lining wear indicator shown in FIGS. 1 and 2, and corresponding reference numerals have been applied to corresponding parts.

Figure 4:
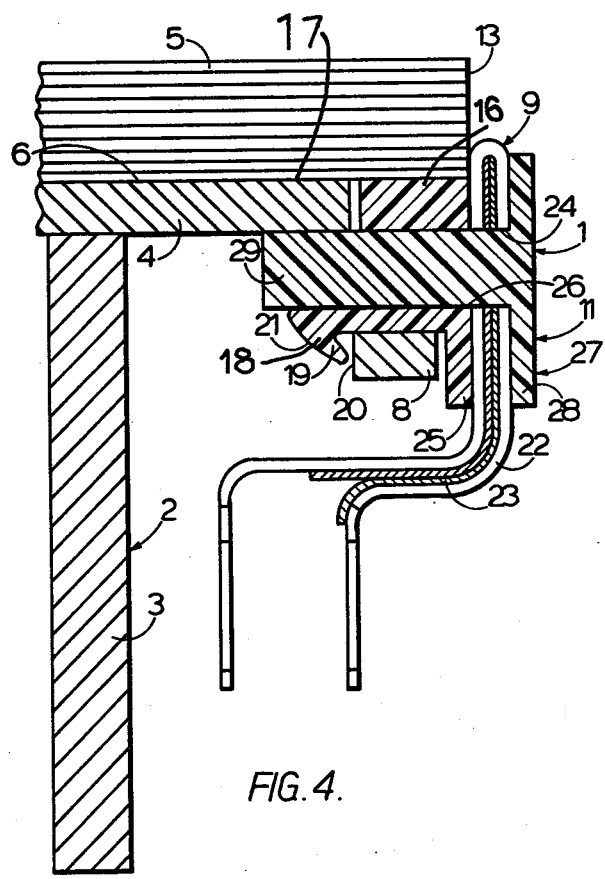
FIG. 4 is a section on the line 4—4 of FIG. 3.

In FIGS. 3 and 4 the construction of brake shoe 2 is identical to that of FIGS. 1 and 2.

In this modification the sensor 9 comprises a generally rectangular pressed metal strip 22 coated with insulating material 23. The strip 22 is provided with a cut out portion 24 through which a part of the plug 11 is adapted to project, and the ends of the strip are connected to the electric circuit.

The strip 22 is held in position adjacent the edge 13 of the lining 5 by the plug 11, which has two components. The component 25 is similar to the plug of FIGS. 1 and 2, and is similarly located in the depression 7. The component 25 has a first projection 16, with the whole length of the outer surface 17 in contact with the lining 5. The second projection 18 is in two parts, each being provided with a retaining lip 19 for engagement with edge 20 of the sheared portion 8. The component 25 is also provided with an axially extending bore 26, the cross-sectional shape of the bore 26 being the same as that of the cut out 24. The second component 27 of the plug 11 comprises an end portion 28 of rectangular outline and an axial projection 29 extending perpendicularly, which is adapted to fit in the cut out 24 and the bore 26 to secure the strip 22 in the plug.

The strip 22 is thus retained in position between the components 25, 27.

Assembly of the indicator 1 is effected by inserting the component 25, locating the strip 22 with the cut out 24 in alignment with the bore 26 and finally inserting the projection 29 of component 27. Removal is by reversing these operations.

The indicator operates as described in relation to FIGS. 1 and 2.

Figure 5:
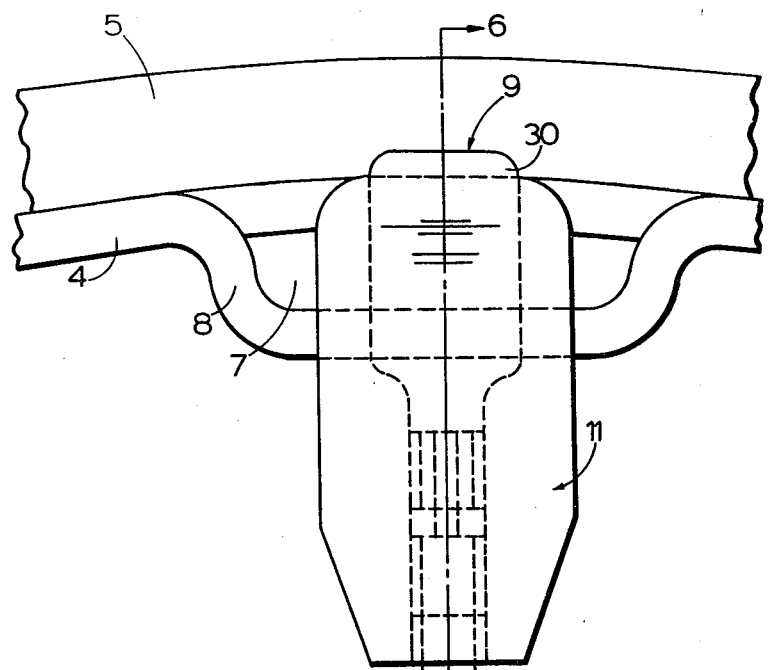
FIG. 5 is a view similar to FIG. 1 showing a further modified indicator.
Figure 6:
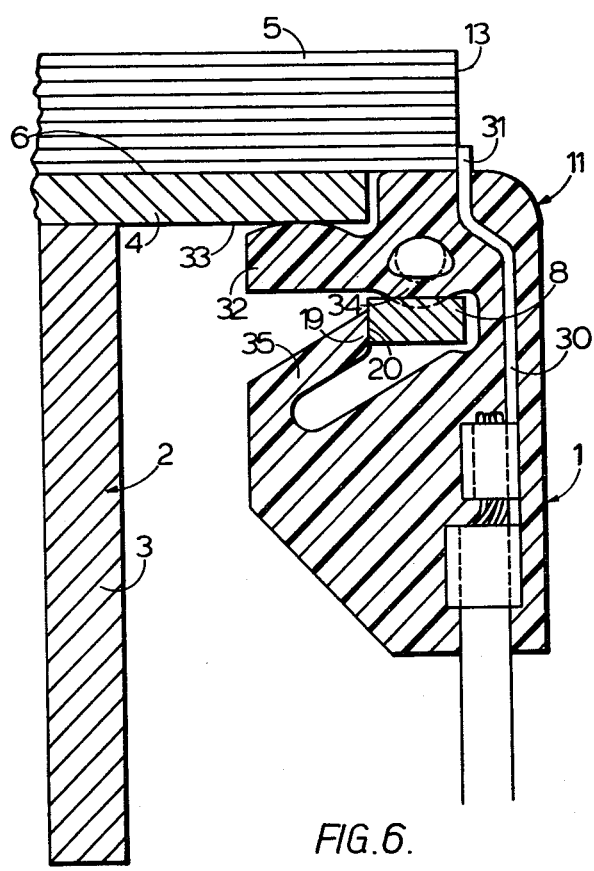
FIG. 6 is a section on the line 6—6 of FIG. 5.

FIGS. 5 to 8 show two further modified indicators. In FIGS. 5 and 6 the brake shoe 2 is constructed similarly to that shown in the previous Figures. The shape of the depression 7 is slightly different in order to accommodate the modified indicator.

The indicator 1 comprises a sensor 9 integral with a plug 11. The sensor comprises a pressed metal strip 30, the ends of which are connected to the electric circuit, and a portion 31 projects out of the plug, and is adapted to engage the edge 13 of the lining 5 in use, for contact with the rotatable drum.

The plug 11 is provided with a portion 32 which is adapted to engage with the inner radial edge 33 of the platform 4, and a portion 34 located in the depression and which is slightly deformed in use. The plug is also provided with an arm 35 which engages with the edge 20 of the sheared portion 8 to retain the plug in position.

Assembly of the indicator 1 is simple, as the plug is merely pushed in, and the sheared portion 8 will act to compress the portion 34 and to deflect the arm 35 until it reaches the edge 20, when it will spring back to engage the edge 20 and retain the plug in position, with the sensor strip 30 in contact with the edge 13 of the lining 5.

The indicator operates as in the previous embodiments.

Figure 7:
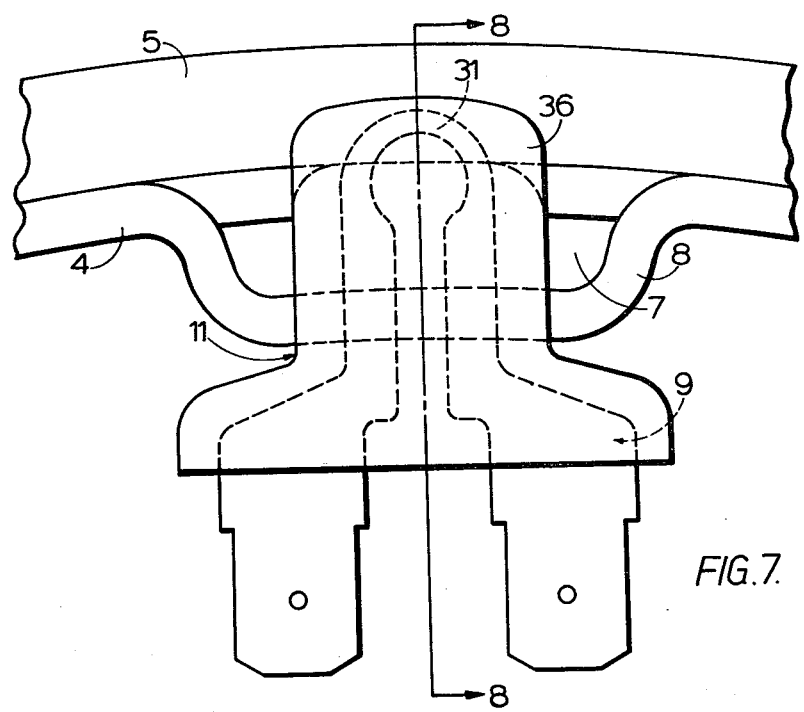
FIG. 7 shows a modified indicator similar to that of FIG. 5.
Figure 8:
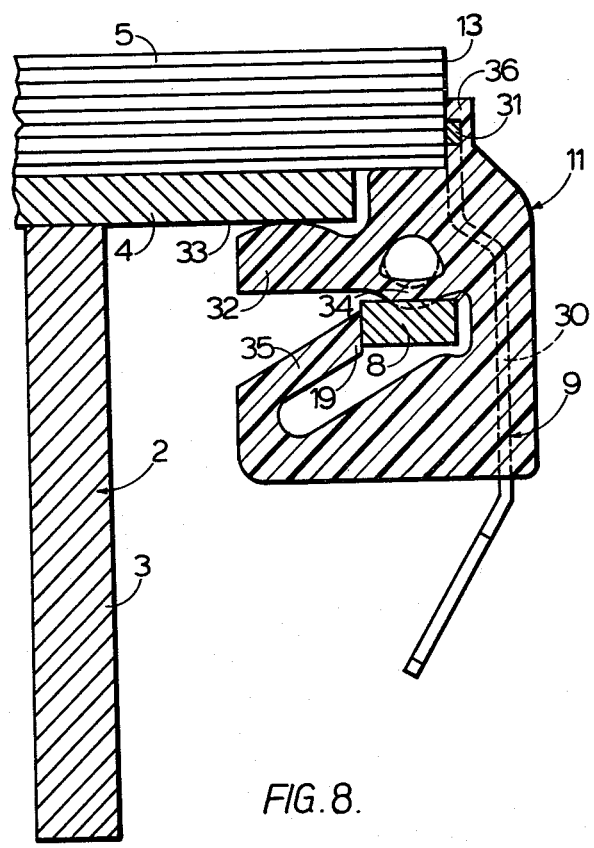
FIG. 8 is a section on the line 8—8 of FIG. 7.

The indicator shown in FIGS. 7 and 8 is very similar to that of FIGS. 5 and 6, with the sensor and the plug integral. The portion 31 of the sensor 9 which is adapted to contact the drum does not project from the plug 11, however, and a plug if formed with an integral projection 36 enclosing the portion 31. This means that the rotatable drum wears through the plug portion 36 before contacting the sensor 31.

The construction and assembly of the plug 11 and the operation of the indicator 1 is otherwise the same as that of FIGS. 5 and 6.

Figure 9:
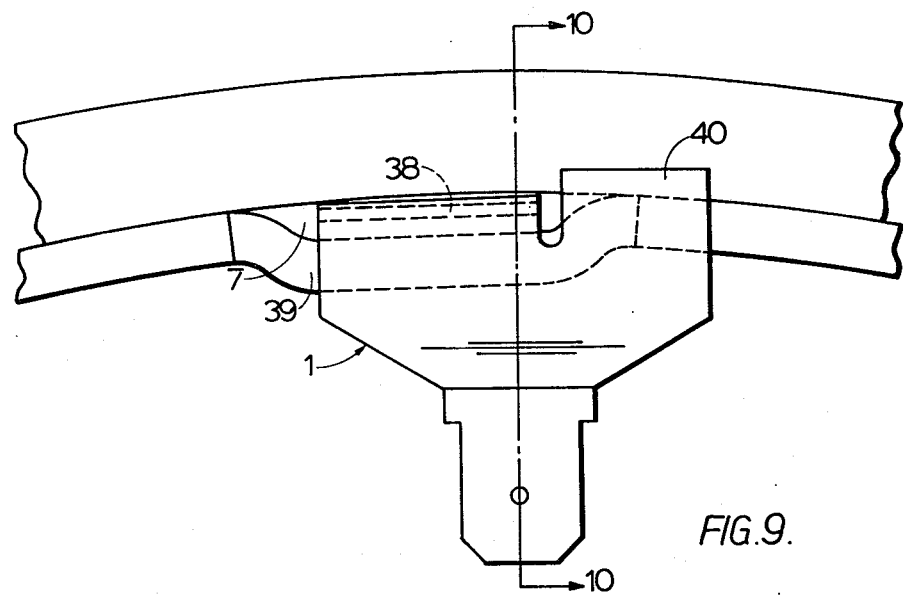
FIG. 9 is an end view of an indicator located in a non-sheared depression in a brake shoe.
Figure 10:
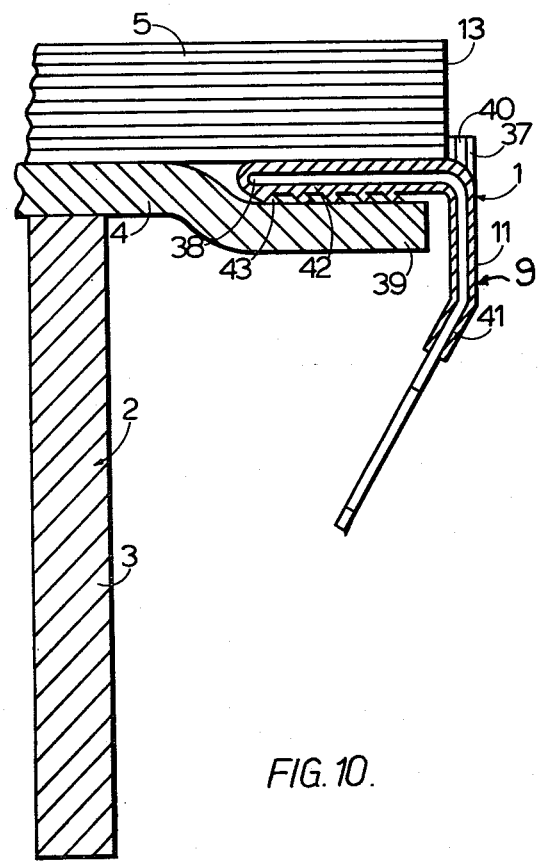
FIG. 10 is a section on the line 10—10 of FIG. 9.
Figure 11:
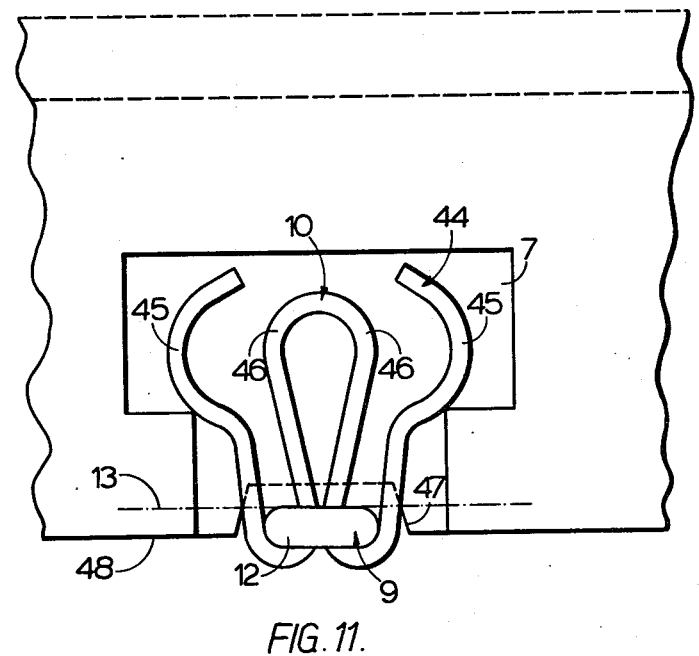
FIG. 11 is a top view of an indicator located in a sheared depression in a brake shoe, and shows modified mounting means.
Figure 12:
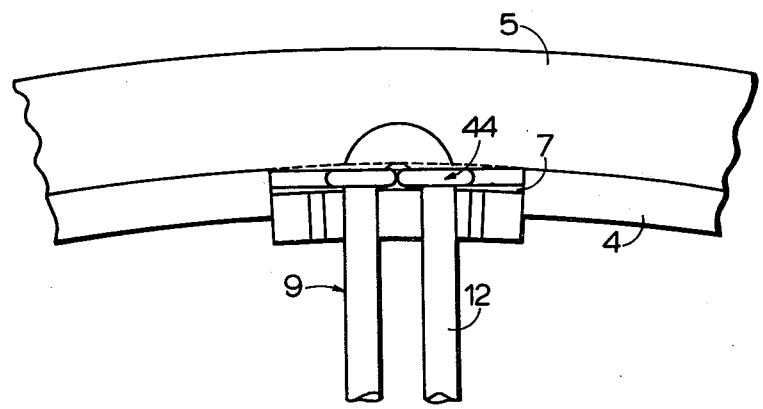
FIG. 12 is an end view of FIG. 11.

In the embodiment of FIGS. 9 and 10 the construction of the brake shoe is similar to that of the previous embodiments, except that the edge of the platform 4 is simply depressed in a radial direction rather than sheared to form the depression.

The indicator 1 comprises a sensor 9 integral with a plug 11.

The sensor 9 comprises a pressed metal strip 37, formed at one end with two arms. A first arm 38 is adapted to fit in the depression 7 between the lining 5 and a depressed portion 39 of the platform 4. A second, shorter arm 40 is perpendicular to the arm 38 and is located adjacent the edge 13 of the lining 5 for contact with the rotatable drum. The other end of the strip 37 remote from the arms 38, 40 is adapted for connection to the electric circuit.

The plug 11 comprises insulating material which coats the strip 37. The plug 11 is provided on one side 42 of the first arm 38 with retaining means in the form of spaced teeth 43. The teeth 43 are integral with the insulating material 38 and are adapted to deflect when the indicator is inserted into the depression 7 and to engage with the depressed portion 39 of the platform 4 to retain the sensor 9 in position with the second arm 40 adjacent the lining 5.

The indicator can thus be assembled by simply pushing the first arm 39 into the depression 7.

The indicator operates as in the previous embodiments.

In a modification (not shown) the strip 37 can be formed with three arms, with the central arm adapted to contact the rotatable drum, and the outer arms located in the depression.

In the embodiment of FIGS. 11 to 16 the lining wear indicator 1 is located in a part-sheared depression 7 on the platform 4. The depression 7 is generally T-shaped, and accommodates the mounting means 10, which comprises a resilient metal clip 44. The metal clip 44 (see FIG. 16) is generally W-shaped, having a pair of outer arms 45 and a pair of inner arms 46. The outer arms 45 are curved and provide the retaining means which retain the clip 44 in the T-shaped depression 7.

Figure 13:
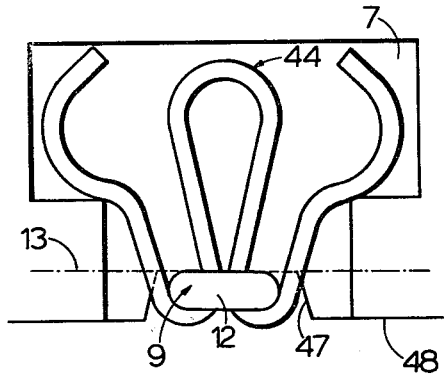
FIGS. 13 and 14 show the depression of FIG. 11, showing different positions of the indicator.
Figure 14:
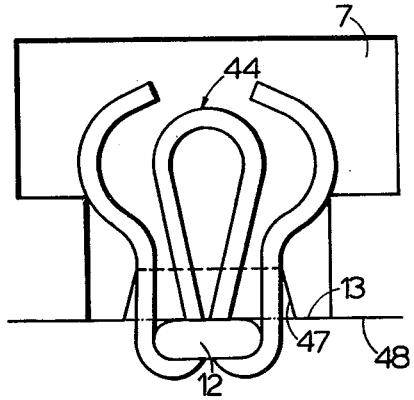

The sensor 9 comprises a loop of insulation-coated wire 12 (as in the embodiment of FIGS. 1 and 2), which is retained by the clip 44 between pairs of adjacent outer and inner arms 45 and 46, and adjacent the lining 5. The clip 44 is also able to overcome the problem of holding the sensor 9 adjacent the lining 5 when the edge 13 of the lining is not flush with the edge of the platform 4. As shown in FIGS. 13 and 14, the clip 44, due to its resilient construction, and arrangement in the T-shaped depression 7, can hold the wire 12 in a number of different positions. A recess 47 is provided in the depression 7, which accommodates the wire 12 when the edge 13 of the lining 5 does not extend to the edge 48 of the platform 4, as in FIG. 13. FIG. 14 shows the position of the indicator when the edge 13 of the lining 5 is flush with the edge 48 of the platform 4. These Figures represent the two extremes of the lining position on the platform due to manufacturing tolerances.

Figure 15:
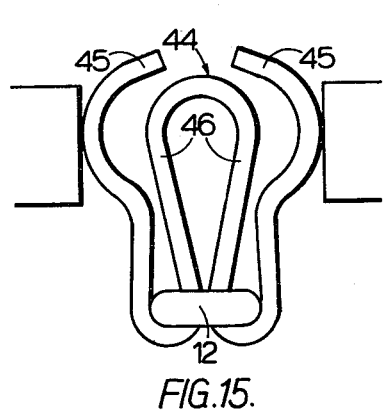
FIG. 15 shows the assembly of the indicator.
Figure 16:
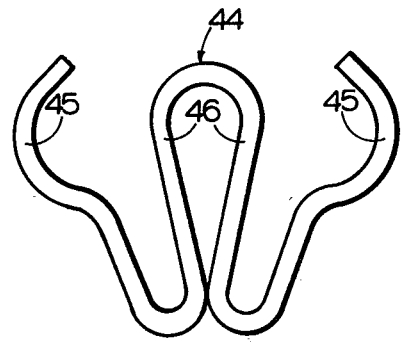
FIG. 16 shows the mounting means.

The indicator 1 is assembled by locating the wire 12 between pairs of adjacent outer and inner arms 45 and 46, and deforming the outer arms 45 (as shown in FIG. 15), so that the clip 44 can be inserted into the depression 7. The indicator is removed by simply removing the clip 44 from the depression 7.

The operation of the indicator 1 is the same as that described in relation to the previous embodiments.

Using a metal clip as the mounting means has the advantage that it can withstand the heat generated during braking better than a plastics plug.

I claim:

1. A friction lining wear indicator for a brake shoe of a shoe-drum brake, said brake shoe including a platform and a friction lining carried by said platform for engagement with a rotatable drum, said platform having axial edges and a depression formed in one of said axial edges by displacement of a portion of said one edge in a radial direction away from said friction lining, said friction lining having a first face for engagement with said platform and a second face for engagement with said drum, a portion of said first face of said friction lining in the region of said displaced portion of said edge being unmodified, said friction lining wear indicator comprising a sensor mounted on said brake shoe, an indicating means adapted to be actuated when the thickness of said friction lining is less than a predetermined value, mounting means for mounting said sensor on said shoe, said mounting means being located in said depression, and retaining means associated with said mounting means for co-operating with said shoe to retain said sensor in a position of use adjacent said lining.

2. A friction lining wear indicator as claimed in claim 1, wherein said retaining means is releasable.

3. A friction lining wear indicator as claimed in claim 1 or claim 2, wherein said mounting means comprises a plug of plastics material, and said retaining means comprises at least one lip, said lip engaging with said shoe to retain said plug in said depression.

4. A friction lining wear indicator as claimed in claim 1, wherein said sensor is integral with said mounting means.

5. A friction lining wear indicator as claimed in claim 1, wherein said sensor comprises a loop of wire separate from said mounting means.

6. A friction lining wear indicator as claimed in claim 1, wherein said sensor comprises a pressed insulation-coated metal strip.

7. A friction lining wear indicator as claimed in claim 1, wherein said mounting means is a one-piece plastics plug, said plug being located in a sheared depression in said platform, and said sensor comprises a loop of wire separate from said plug.

8. A friction lining wear indicator as claimed in claim 1, wherein said mounting means comprises a two-piece plastics plug, said plug being located in a sheared depression in said platform, and said sensor comprises a pressed insulation-coated metal strip separate from said plug.

9. A friction lining wear indicator as claimed in claim 1, wherein said mounting means comprises a one-piece plastics plug, said plug being located in a sheared depression in said platform, and said sensor is integral with said plug.

10. A friction lining wear indicator as claimed in claim 1, wherein said mounting means comprises a plug of plastics material, said plug being located in a non-sheared depression in the platform, and said plug coats a pressed metal strip which comprises said sensor.

11. A friction lining wear indicator as claimed in claim 1, wherein said sensor and said drum with which said lining is adapted to engage are connected in series in a circuit containing said indicating means, such that when said sensor touches said drum said indicating means is actuated.

12. A shoe-drum brake comprising a rotatable drum, and at least one brake shoe comprising an arcuate web and a platform and a friction lining carried by said platform for engagement with said drum, said platform having axial edges and a depression formed in one of said axial edges by displacement of a portion of said one edge in a radial direction away from said friction lining, said friction lining having a first face for engagement with said platform and a second face for engagement with said drum, a portion of said first face of said friction lining in the region of said displaced portion of said edge being unmodified, said brake also incorporating a friction lining wear indicator, said indicator comprising a sensor mounted on said shoe, an indicating means adapted to be actuated when the thickness of said lining is less than a predetermined value, mounting means for mounting said sensor in said depression, and retaining means associated with said mounting means for co-operating with said shoe to retain said sensor in a position of use adjacent said lining.

* * * * *